UNITED STATES PATENT OFFICE.

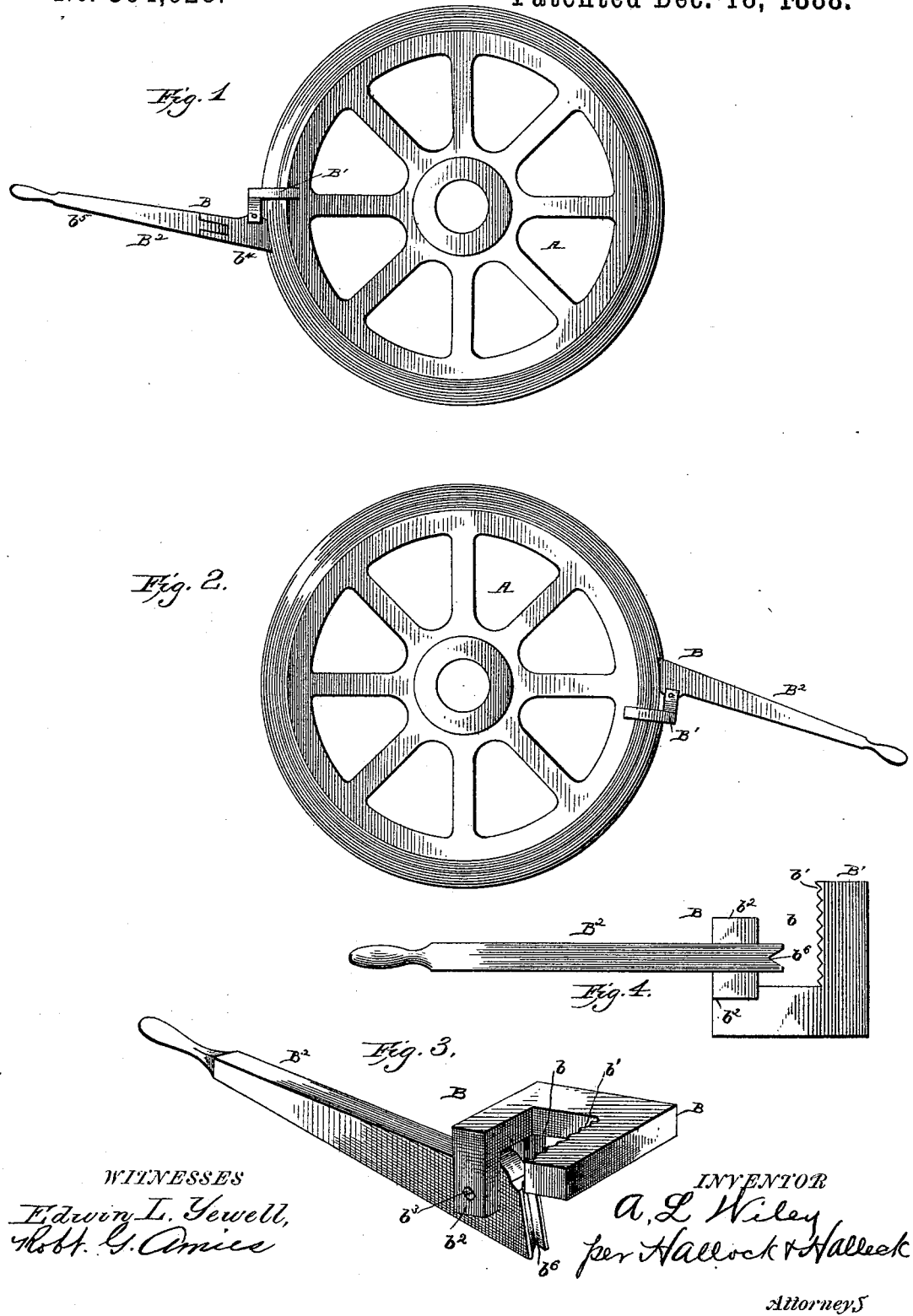

ABRAHAM L. WILEY, OF BETHEL, INDIANA.

CAR-MOVER.

SPECIFICATION forming part of Letters Patent No. 394,628, dated December 18, 1888.

Application filed September 4, 1888. Serial No. 284,555. (No model.)

*To all whom it may concern:*

Be it known that I, ABRAHAM LINCOLN WILEY, a citizen of the United States, residing at Bethel, in the county of Wayne and State of Indiana, have invented certain new and useful Improvements in Car-Movers; and I do hereby declare the following to be a full, clear, and exact description of the invention, such as will enable others skilled in the art to which it appertains to make and use the same.

My invention relates to that class of devices known as "car-starters."

The object and nature of the invention will more fully appear from the subjoined description and claims, reference being had to the accompanying drawings, which represent, in—

Figure 1, a side elevation of a car-wheel with my device attached; Fig. 2, a side elevation showing my device attached to a car-wheel for moving the car in the direction opposite to that shown in Fig. 1; Fig. 3, a perspective of my device, and Fig. 4 a top plan view.

A is the car-wheel, and B the car starter or mover. This starter or mover consists of two parts—the clamp B' and the lever $B^2$. The clamp B' is provided with a recess, $b$, which embraces the rim of the wheel. The inner side of the recess is provided with serrations or teeth $b'$, for contact with the inside surface of the rim, to prevent the part B' from slipping when the device has been applied to a wheel. The upper side of the clamp is provided with lugs or ears $b^2$, having holes for the pin $b^3$, which passes through a hole in the lever $B^2$ to serve as a fulcrum for the latter. This lever is preferably formed of two parts—a casting, $b^4$, and a handle, $b^5$, which is inserted in a socket in said casting $b^4$. If desired, the handle and casting may be made in one piece. The front end of casting $b^4$ has a longitudinal groove, $b^6$, which fits over the flange of the car-wheel and prevents lateral slipping when the device is in place.

The operation of the device is as follows: If it be desired to pull the car toward the operator, the device is placed upon the wheel in the manner shown in Fig. 1—that is, the clamp is so placed as to embrace the rim of the wheel and the grooved face of the lever embracing the flange at a point below the clamp, so that when the lever is pressed down the flange will be clamped between the groove $b^6$ on the lever and the serrated face $b'$ on the clamp. If sufficient force be now used upon the lever, the car will move toward the operator. If it be desired to move the car from the operator, the device is placed as shown in Fig. 2, where the position of the parts are reversed, so that when the lever is lifted the car will be moved in the direction opposite to that which occurs when the lever is depressed. This reversal of parts is accomplished by shifting the device from one wheel to its mate on the opposite rail.

What I claim as new is—

1. A car starter or mover consisting of a clamp having a recess to embrace the rim of the wheel and a lever journaled upon said clamp and having the short arm adapted to contact with the periphery of the wheel, substantially as described.

2. A car starter or mover consisting of a clamp having a recess with serrated face for embracing the rim of the wheel and a lever journaled upon said clamp and having a grooved end which is adapted to embrace the flange on the wheel, substantially as described.

In testimony whereof I affix my signature in presence of two witnesses.

A. L. WILEY.

Witnesses:
O. C. MACKEY,
CHAS. KERCHER.